United States Patent Office 2,960,518
Patented Nov. 15, 1960

2,960,518
ETHYLENE PRODUCTION PROCESS

Kurt Peters, Getreidemarkt 9, Vienna VI, Austria

No Drawing. Filed Sept. 23, 1958, Ser. No. 762,710

Claims priority, application Austria Sept. 27, 1957

10 Claims. (Cl. 260—449.6)

This invention is concerned with improvements in or relating to the production of ethylene and is more particularly concerned with the production of gaseous mixtures predominantly consisting of ethylene by the reaction of carbon monoxide and hydrogen, and with catalysts for such reaction.

It is known that higher hydrocarbons, particularly liquid and solid paraffins and olefins, can be synthesized by the reaction of carbon monoxide and hydrogen at normal pressure using iron, cobalt or nickel as the catalyst for the reaction, cobalt and iron catalysts being especially preferred. This process has been carried out for the production of liquid hydrocarbons in the distillation range of petroleum and diesel oils and for the production of solid, particularly straight-chain, paraffins and in such processes gaseous hydrocarbons have been regarded as troublesome side products and their formation has been suppressed as far as possible.

In later developments of this process, gaseous olefins have been produced by carrying out the reaction in the presence of iron catalysts and at higher temperatures than in processes for the production of liquid and solid paraffins. Thus a known process for the production of unsaturated hydrocarbons, particularly gaseous unsaturated hydrocarbons, comprises carrying out the reaction at temperatures above 450° C., preferably at temperatures of 470° to 600° C., under normal or slightly raised pressure and in the presence of a finely divided pure-iron catalyst, to which may be added, if desired, one or more cracking catalysts, such as active silicates, for example, aluminum, magnesium and zinc silicates. The yields of olefins from this process are, however, poor and the high temperatures employed give rise to the formation of heavy carbonaceous deposits on the catalyst which renders frequent regeneration of the latter necessary. Another known process, which is also carried out with iron catalysts, namely incompletely reduced iron catalysts, avoids the necessity for the use of such high temperatures but, in order to increase the yield of ethylene as compared with the previously mentioned process, is carried out under reduced pressure.

A further known process for the production of unsaturated gaseous hydrocarbons by the reaction of carbon monoxide and hydrogen is carried out in the presence of a stable oxide of a metal of the second to the seventh group of the periodic table as catalyst, to which an acid, such as a hydrogen halide acid, nitric acid, sulphuric acid or sulphonic acids, is preferably added in an amount of 0.3 to 3% based on the weight of the catalyst. This process also requires, however, reaction temperatures over 520° C. and, in addition to ethylene and higher olefins, also gives rise to considerable amounts of ethane, which makes it necessary to apply complicated separation procedures to the gaseous reaction product.

It is an object of the present invention to provide a novel catalyst whereby gaseous mixtures predominantly consisting of ethylene, i.e. containing up to 95% of ethylene, may be produced by the reaction of carbon monoxide and hydrogen, the reaction being carried out under more economic operating conditions than hitherto.

I have now most surprisingly found that gaseous hydrocarbon mixtures consisting almost completely of ethylene can be obtained from the reaction of carbon monoxide and hydrogen at normal or slightly raised pressure and at a temperature of 350° to 520° C. using a catalyst which consists of four components, the first being a mixture of one or more substances chosen from the group which consists of zinc oxide, cadmium oxide, copper and silver with one or more substances chosen from the group consisting of chromium oxide, vanadium oxide, niobium oxide, tantalum oxide, molybdenum oxide, tungsten oxide and uranium oxide; the second being one or more metals of the eighth group of the periodic table or compounds thereof; the third being an oxide or hydroxide of one or more substances chosen from the group which consists of aluminum, silicon, titanium, zirconium, hafnium, thorium, scandium, yttrium and the rare-earth elements; and the fourth being a carbonate, oxide or hydroxide of an alkali metal.

According to the present invention, therefore, there is provided a catalyst for the production of gaseous hydrocarbon mixtures predominantly consisting of ethylene from the reaction of carbon monoxide and hydrogen which consists of the four components described above.

The present invention also includes a process for the production of gaseous hydrocarbon mixtures predominantly consisting of ethylene which comprises reacting carbon monoxide and hydrogen at normal or superatmospheric pressure and at a temperature of 350° to 520° C., preferably 350° to 450° C., in the presence of the catalyst described above.

The first component of the catalyst according to the invention may be activated, if desired, by the addition of one or more oxides chosen from the group which consists of magnesium oxide, zirconium oxide, hafnium oxide, thorium oxide and rare-earth-element oxides. The preferred combination for the first component is a mixture of zinc oxide and chromium oxide with or without the addition of one or more of the foregoing activators.

The second component is preferably cobalt. Very favorable results can, however, also be obtained by using iron as the second component, although in this case the amount of iron present in the catalyst must be restricted; as if too much iron is present the selective formation of ethylene by the catalyst is reduced. In general, it may be said that the catalyst should not contain more than 10%, and preferably only from 0.1 to 1%, of the second component based on the overall weight of the catalyst, whether the second component be cobalt, iron or any other transition metal (as distinct from the noble metals) of the eighth group of the periodic table. The second component can be activated, if desired, by the addition of one or more substances chosen from the group which consists of magnesium oxide, thorium oxide, manganese oxide, a rare-earth-element oxide, copper and silver.

The fourth component is preferably included in the catalyst in only small amounts. In addition to being incorporated in the catalyst in the form of a carbonate, oxide or hydroxide of an alkali metal, it may also be incorporated in the form of other salts of the alkali metal, such as the chromate or vanadate, where the treatment of the catalyst prior to use is such as to convert such salts into the hydroxide or oxide of the alkali metal. In many cases a suitable proportion of the fourth component in the catalyst according to the invention can be obtained by not completely washing out from the catalyst the alkaline precipitating agents used to precipitate the metal salts forming other components of the catalyst.

Exhaustive experiments with the catalyst according to the invention have shown that it is to a great extent immaterial to the utility of the catalyst in synthesizing ethylene whether individual substances or mixtures of more than one substance are used for each of the components of the catalyst and whether one and the same substance fulfills more than one function. Thus, for example, copper can simultaneously activate both the first and second components of the catalyst. Other substances can also perform several functions in the catalyst. It is however the characteristic of the catalyst according to the invention that substances capable of acting as each of the four components should be simultaneously present whether the catalyst is a commonly prepared chemical mixture, or is a mixture of the four components which have previously been individually prepared, or consists of a layer-like arrangement of the different components.

The catalyst according to the invention is distinguished by prolonged activity, and the formation of carbonaceous deposits thereon during the reaction is slight so that it only requires regeneration, if at all, at long intervals of time. Regeneration when necessary, can be effected by heating the spent catalyst in air or air-nitrogen mixtures followed by reduction; by means of this treatment the catalyst fully recovers its original activity and selectivity.

Since, with too long contact times with the catalyst, ethylene is subjected to secondary reactions, it is preferred to restrict the contact time of the gaseous reaction mixture with the catalyst to not more than about 5 seconds. Experiments have shown that contact times of this order are not sufficient to effect the thermodynamic equilibrium of the ethylene-synthesis reaction. Separation of ethylene from the gaseous reaction product and purification of the separated ethylene can be effected in any suitable manner and procedures for effecting such separation and purification are known. The unreacted gaseous starting material is preferably recycled in any convenient manner after the separation of the ethylene.

As indicated above, the process according to the invention can be carried out at normal pressure and under superatmospheric pressure. In view of the high selectivity of the new catalyst according to the present invention the use of moderate superatmospheric pressures is particularly advantageous, since the yield of olefin with a single passage of the synthesis gas over the catalyst increases with the pressure, while the yield of saturated gaseous hydrocarbons increases to a far lesser degree for the same pressure increase than would be expected from the increase in the hydrogen partial pressure. When the process is carried out under high pressures, it has been found preferable to employ a catalyst containing an amount of the second component which corresponds to the lower region of the above-stated range of proportions.

In use, the catalyst according to the invention can be supported on an inert carrier substance having a large surface area or it can be suspended, in subdivided form, in a stream of the gaseous reaction mixture as a fluidized bed. Kieselguhr, pumice stone, ceramic substances, synthetic or natural silicates, fullers' earths and lignite ashes can, for example, be used as inert carrier substances for the catalyst. Alternatively, the first or the third component of the catalyst can also serve simultaneously as the carrier substance.

Although, as with every catalyst, the manner of production of the catalyst according to the invention influences the activity thereof, the catalyst can be prepared in various ways. Active catalysts can, for example, be produced not only by calcining of mixtures of the appropriate oxides and subsequent reduction of the mixture in a stream of hydrogen, but also by simultaneous precipitation of the hydroxides of the appropriate metals from solutions containing salts or complex salts of these metals, with or without carriers, and subsequent drying and reduction, or even by absorption of solutions containing salts of the appropriate metals by an inert carrier susbtance. Finally, the different catalyst components can also be produced separately and then mixed.

In order that the invention may be more fully understood, the following examples, in which all parts are by weight, are given by way of illustration only:

Example 1

A synthesis gas containing 46.4% carbon monoxide, 42.5% hydrogen and 11.1% inert gas was passed, at normal pressure with a flow velocity of 350 liters per hour, with a contact volume of 1 liter and at a temperature of 430° C. over a catalyst containing 51 parts zinc oxide, 13 parts chromium oxide, 0.64 part cobalt and 0.04 part potassium oxide, supported on 100 parts of active alumina. 25 liters of ethylene and 2 liters of ethane were obtained per normal cubic meter of synthesis gas. The catalyst showed an ethylene selectivity of 95.6%.

The catalyst was produced by dissolving 8.0 g. active zinc oxide, 5.25 g. chromium nitrate, and 0.5 g. cobalt nitrate in 1,000 ccs. of water containing a little nitric acid and suspending 15.55 g. commercial active alumina (e.g. Alcoa mesh ⅛) with a bulk density of 780 g./liter and a water uptake of 400 g./liter in this solution. The suspension was then heated to 80° C. and reacted with 20% aqueous potassium carbonate, also heated to 80° C., until the metal salts had been completely precipitated. The precipitate was filtered off, washed with potassium-carbonate solution and dried first for 2 hours at 80° C., then for 2 hours at 100° C. and finally for 3 hours at 120° C. Subsequently, the catalyst was reduced in a stream of hydrogen at a temperature which was increased by 50° every two hours from 200° to 450° C., reduction being continued for a further five hours at the latter temperature.

Example 2

A synthesis gas containing 54.7% carbon monoxide, 40.6% hydrogen and 4.7% inert gas was passed at a pressure of 20 atmospheres and a temperature of 390° C. with a space velocity of 500 liters (N.T.P.) per hour and with a contact volume of 1 liter over a catalyst containing 40 parts zinc oxide, 12 parts chromium oxide, 3 parts copper, 2 parts manganese oxide, 0.15 part cobalt and 0.02 part potassium oxide, supported on 100 parts of active alumina. From each cubic meter (N.T.P.) of synthesis gas, 87 liters ethylene, 3 liters propylene and butylene and 7 liters ethane were obtained.

The catalyst was prepared by dissolving 26.6 g. zinc nitrate, 15.9 g. chromium nitrate, 5.7 g. copper nitrate, 1.8 g. manganese nitrate, and 0.37 g. cobalt nitrate in 2,000 ccs. water; 50 g. active alumina were suspended in the solution and the mixture was reacted at 80° C. with vigorous stirring with an aqueous solution of ammonia in which 0.02 g. potassium carbonate had been dissolved, this solution also being at 80° C., until the metal salts had been completely precipitated. The precipitate was filtered off and dried for 2 hours at 80° C., 2 hours at 100° C., and 3 hours at 120° C. In order to activate the catalyst it was then heated for two hours at 300° C., for 1 hour at 400° C., and for five hours at 500° C., and this was followed by reduction in a stream of hydrogen under normal pressure for 10 hours at 500° C.

Example 3

A synthesis gas containing 68% carbon monoxide, 28% hydrogen and 4% inert gases was passed at normal pressure at a temperature of 410° C. with a flow velocity of 300 liters per hour and a contact volume of 1 liter over a catalyst containing 51 parts zinc oxide, 13 parts chromium oxide, 1 part cobalt, 1 part silver, 0.5 part potassium oxide and 100 parts of kieselguhr. 26.6 liters of ethylene together with small amounts of ethane and higher hydrocarbons were obtained per cubic meter (N.T.P.) of synthesis gas. The catalyst was prepared by dissolving 46.6 g. zinc nitrate, 6.28 g. chromium nitrate, 1.23 g. cobalt and 0.39 g. silver nitrate in 2,000 cc. water. 100 parts of kieselguhr, which had previously been purified by boiling it twice with hydrochloric acid and twice with nitric acid, were suspended in this solution and the metal salts were precipitated onto the suspended kieselguhr by reaction of the suspension with 30% aqueous potassium carbonate solution at 80° C. The precipitate was dried after the filtration for 2 hours at 80°, for 2 hours at 105° and for 2 hours at 150° C., activated by heating for four hours at 450° C. in a stream of air, and was then reduced for 10 hours in a stream of hydrogen at 500° C.

*Example 4*

A synthesis gas containing 62% carbon monoxide, 24% hydrogen and 14% inert gases was passed at 450° C. and normal pressure with a flow velocity of 365 liters per hour and a contact volume of 1 liter over a catalyst containing 29.1% copper, 23.9% chromium oxide, 1.0% cobalt, 46.0% active alumina and about 0.05% $K_2O$. From each cubic meter (N.T.P.) of synthesis gas, 20.4 liters of ethylene, 0.97 liter of ethane and small, insignificant amounts of higher hydrocarbons were obtained.

The catalyst was prepared by adding a solution of 24.16 g. copper nitrate, 139 g. aluminum nitrate and 1.06 g. cobalt nitrate in 1,000 cc. water at 70° C. dropwise to a solution of 19.42 g. potassium chromate and 300 g. potassium carbonate in 1,000 cc. water, while stirring the latter solution. The precipitated metal salts were filtered off with suction and the precipitate washed with distilled water until the $K_2O$ content thereof fell to 0.05% $K_2O$ based on the total weight. The washed precipitate was dried for 2 hours each at 80°, 100°, 120° and 180° C. and activated by heating for four hours at 500° C. in a stream of air, followed by reduction for 12 hours at 520° C. in a stream of hydrogen.

*Example 5*

A synthesis gas with a carbon-monoxide-to-hydrogen ratio of 3.5:1 was passed at 400° C. and atmospheric pressure with a flow velocity of 315 liters per hour and a contact volume of 1 liter over a catalyst containing 30.7% zinc oxide, 0.6% silver, 7.8% chromium oxide, 0.6% cobalt, 59.7% active alumina and 1.0% potassium oxide. 23 liters of ethylene and 1 liter of propylene and butylene were obtained from each cubic meter (N.T.P.) of synthesis gas.

For production of the catalyst the appropriate amounts of zinc nitrate, cobalt nitrate and silver nitrate were dissolved in water, the appropriate amount of active alumina suspended in this solution and the salts precipitated at 80° C. with stirring by the addition of a 10% aqueous potassium carbonate solution. The precipitate was filtered off with suction, thoroughly washed, dried for 12 hours at 105° C. and permeated with an aqueous solution of potassium dichromate. The catalyst was dried by heating for two hours each at 80° C., 105° C. and 130° C., and thereafter for 12 hours at 180° C., and activated by heating in a stream of air for two hours each at 300° C. and 400° C. and for 4 hours at 500° C., followed by reduction in a stream of hydrogen for 6 hours at 450° C.

*Example 6*

A synthesis gas with a carbon-monoxide-to-hydrogen ratio of 3.5:1 was passed at 430° C. and 20 atmospheres pressure with a flow velocity of 315 liters per hour and a contact volume of 1 liter over the catalyst described in Example 5 and produced according to that example. 31 liters of ethylene, 0.5 liter of propylene and 0.5 liter of ethane were obtained per cubic meter (N.T.P.) of synthesis gas.

I claim:

1. A process for the production of gaseous hydrocarbon mixtures predominantly consisting of ethylene which comprises the step of reacting carbon monoxide and hydrogen at a temperature of 350° to 520° C. in the presence of a catalyst which consists of four components; the first of said components being a mixture of chromium oxide and at least one substance selected from the group consisting of zinc oxide, copper and silver; the second component being cobalt; the third component being at least one substance selected from the group consisting of alumina and kieselguhr; and the fourth component being potassium oxide; said second component constituting up to 10% of the total weight of the catalyst.

2. A process for the production of gaseous hydrocarbon mixtures predominanoly consisting of ethylene which comprises the step of reacting carbon monoxide and hydrogen at a temperature of 350° to 450° C. in the presence of a catalyst which consists of four components; the first component being a mixture of chromium oxide and at least one substance selected from the group consisting of zinc oxide, copper and silver; the second component being cobalt and constituting from 0.1 to 1% of the total weight of the catalyst; the third component being at least one substance selected from the group consisting of alumina and kieselguhr; and the fourth component being potassium oxide.

3. A catalyst for the production of gaseous hydrocarbon mixtures predominantly consisting of ethylene from the reaction of carbon monoxide with hydrogen which consists of four components; the first component being a mixture of chromium oxide and at least one substance selected from the group consisting of zinc oxide, copper and silver; the second component being cobalt and constituting up to 10% of the total weight of the catalyst; the third component being at least one substance selected from the group consisting of alumina and kieselguhr; and the fourth component being potassium oxide.

4. A catalyst according to claim 3 in which said second component constitutes from 0.1 to 1% of the total weight of the catalyst.

5. A catalyst according to claim 3, in which said second component is activated by the addition thereto of an activating agent selected from the group consisting of manganese oxide, copper and silver.

6. A catalyst for the production of gaseous hydrocarbon mixtures predominantly consisting of ethylene from the reaction of carbon monoxide and hydrogen, which consists of a mixture of zinc oxide, chromium oxide, cobalt, alumina and potassium oxide, the cobalt constituting from 0.1 to 1% of the total weight of the catalyst.

7. A catalyst for the production of gaseous hydrocarbon mixtures predominantly consisting of ethylene from the reaction of carbon monoxide and hydrogen, which consists of four components, the first component being a mixture of zinc oxide and chromium oxide activated by the addition of copper; the second component being cobalt and constituting from 0.1 to 1% of the total weight of the catalyst; the third component being alumina; and the fourth component being potassium oxide.

8. A process according to claim 1, in which the contact time of the gaseous reaction mixture with the catalyst is up to 5 seconds.

9. A process according to claim 2, in which said second component is activated by the addition thereto of at least one substance selected from the group consisting of manganese oxide, copper and silver.

10. A catalyst for the production of gaseous hydrocarbon mixtures predominantly consisting of ethylene from the reaction of carbon monoxide and hydrogen, which consists of four components, the first component being a mixture of zinc oxide and chromium oxide activated by the addition of silver; the second component being cobalt and constituting from 0.1 to 1% of the total weight of the catalyst; the third component being alumina; and the fourth component being potassium oxide.

References Cited in the file of this patent

UNITED STATES PATENTS

| | | |
|---|---|---|
| 2,660,599 | Rottig | Nov. 24, 1953 |
| 2,767,202 | Rottig | Oct. 16, 1956 |
| 2,850,515 | Riblett et al. | Sept. 2, 1958 |